United States Patent [19]

Woodward

[11] Patent Number: 4,737,901
[45] Date of Patent: Apr. 12, 1988

[54] HIGH EFFICIENCY POWER SOURCE FOR REACTIVE LOADS

[75] Inventor: Mark A. Woodward, Huntington Beach, Calif.

[73] Assignee: Pacific Power Source Corp., Huntington Beach, Calif.

[21] Appl. No.: 73,893

[22] Filed: Jul. 14, 1987

Related U.S. Application Data

[63] Continuation of Ser. No. 583,305, Feb. 24, 1984, abandoned.

[51] Int. Cl.$^4$ .......................................... H02M 7/525
[52] U.S. Cl. ........................................................ 363/43
[58] Field of Search ........................................... 363/43

[56] References Cited

U.S. PATENT DOCUMENTS

| | | | |
|---|---|---|---|
| 2,994,832 | 8/1961 | James | 330/263 |
| 3,100,851 | 8/1963 | Ross et al. | 363/43 |
| 3,227,889 | 1/1966 | Paynter | 363/43 |
| 3,539,902 | 11/1970 | Hickling | 363/43 |
| 3,832,643 | 8/1974 | Van Heyningen et al. | 363/43 |
| 3,867,643 | 2/1975 | Baker et al. | 363/43 |
| 3,903,469 | 9/1975 | Ravas | 363/43 |

FOREIGN PATENT DOCUMENTS

| | | | |
|---|---|---|---|
| 0085430 | 8/1983 | European Pat. Off. | 363/43 |
| 8103723 | 12/1981 | PCT Int'l Appl. | 363/43 |

Primary Examiner—Patrick R. Salce
Assistant Examiner—Jeffrey Sterrett
Attorney, Agent, or Firm—Lyon & Lyon

[57] ABSTRACT

An apparatus for increasing the power conversion efficiency of electronic amplifiers into both resistive and reactive loads by means of power supply driver bias level switching. The apparatus employs a multi-level direct current voltage supply to provide multi-level biasing to output power devices. Comparator circuits continuously monitor the output voltage and compare it with the direct current multi-level bias voltage of the bias power supply. In accordance with load voltage demands, a switching circuit associated with each comparator selectively connects one of the direct current multi-level power supply voltage to the power amplifying element of the amplifier whereby the minimum voltage of the available multi-level power supply voltage sufficient to maintain operation as a class B amplifier is applied across the output driver.

6 Claims, 2 Drawing Sheets

HIGH EFFICIENCY POWER SOURCE FOR REACTIVE LOADS

This is a continuation of co-pending application Ser. No. 583,305, filed on Feb. 24, 1984, now abandoned.

FIELD OF INVENTION

This invention relates to a method and apparatus for increasing the power conversion efficiency of electronic amplifiers over a wide range of reactive loads and more particularly to a method and apparatus for increasing the power conversion efficiency of a class B electronic amplifier by means of switching selected power supply levels.

Description of Prior Art

With the increased demand for a more controllable and distortion free alternating current power source the need for increased efficiency of these power sources becomes critical. The efficiency effects not only loss of power in the power source but also the packaging requirements. The packaging is effected by the component selection and the need to dissipate heat. As most applications of power sources are not intended to power purely resistive loads, to be useable, the power source must be designed for a wide range of power factors. The allowance for the worst possible power factor often results in an apparatus that does not operate optimally at other power factors. The required design margin results in increased power loss and a requirement that the components be capable of taking a much higher stress level than is normally required.

SUMMARY OF OBJECTIVES OF THE INVENTION

This invention relates to a method and means for increasing the class B amplifier circuit efficiency by selectively applying a power driver biasing voltage level that provides a minimum stress to the electronic power driver component.

During amplification of the input drive signal in a class A or class B transistor amplifier, the transistor operates as a control device by regulating the amount of bias supply voltage applied to the load. Since the power dissipated in the transistor during this controlling process is proportional to the product of the load current and the transistor (collector to emitter) voltage, the higher the transistor voltage for a given current the more power is dissipated in the transistor. Conversely the lower the voltage the less power dissipated and the less stress on the component. The transistor power loss not only represents a decrease in circuit power conversion efficiency but also effects the type of devices available for use and the heat dissipation requirement to remove the lost energy. The voltage across the transistor control device voltage should be kept at a minimum for all levels of load current and power factors if efficiency is to be maximized.

The scheme of this invention is to measure the voltage across the output and as the voltage increases to switch to a higher bias supply voltage for the transistor control device. As the voltage decreases and the output voltage is below the next lower level bias supply voltage the next lower level bias supply voltage is switched to serve as the output driver bias level. In an A.C. application the switching occurs continuously as the voltage varies during each cycle. As a result, the voltage across the output driver is kept below a predetermined maximum. The circuit efficiency increases relative to the number of voltage supply levels available that can be switched.

Although the basic technique of this invention is applicable to both D.C. and A.C. power amplifiers, the instant invention is most useful in A.C. amplifier application. An A.C. amplifier requires a power supply with complementary levels of both positive and negative voltages. The theoretical upper limit of efficiency for a class B amplifier having a fixed primary power supply when driven to saturation by a sine wave is approximately 78.5%. In actual practice, due to losses attributed to other components and non-ideal component behavior, the efficiency does not exceed 70%. By use of the present invention, efficiencies higher than the 78.5% limit have been attained and the theoretical upper limit of power conversion efficiency approaches 100% as the number of supply voltage levels is increased. The practicality of a large number of supply voltage levels depends on the specific application. The actual selection of supply voltage levels is dependent on the character of the output signal. The specific levels are selected to provide optimum power conversion.

In practice an A.C. power amplifier is termed a power source. The power source design does not assume the load will be purely resistive. The power source must be capable of operation over a range of power factors. Most typically a range of +0.7 to −0.7 to unity is specified, with the ability to drive full power to +0.0 or −0.0 power factor, is highly desirable. The present invention employs a means of applying bias power supply levels that extend the advantages of the multi-level switching to reactive loads.

Other objects and advantages of this invention will be made clear and be readily appreciated as they become better understood by reference to the following detailed description and drawings.

DESCRIPTION OF THE PREFERRED EMBODIMENT

Figure 1:
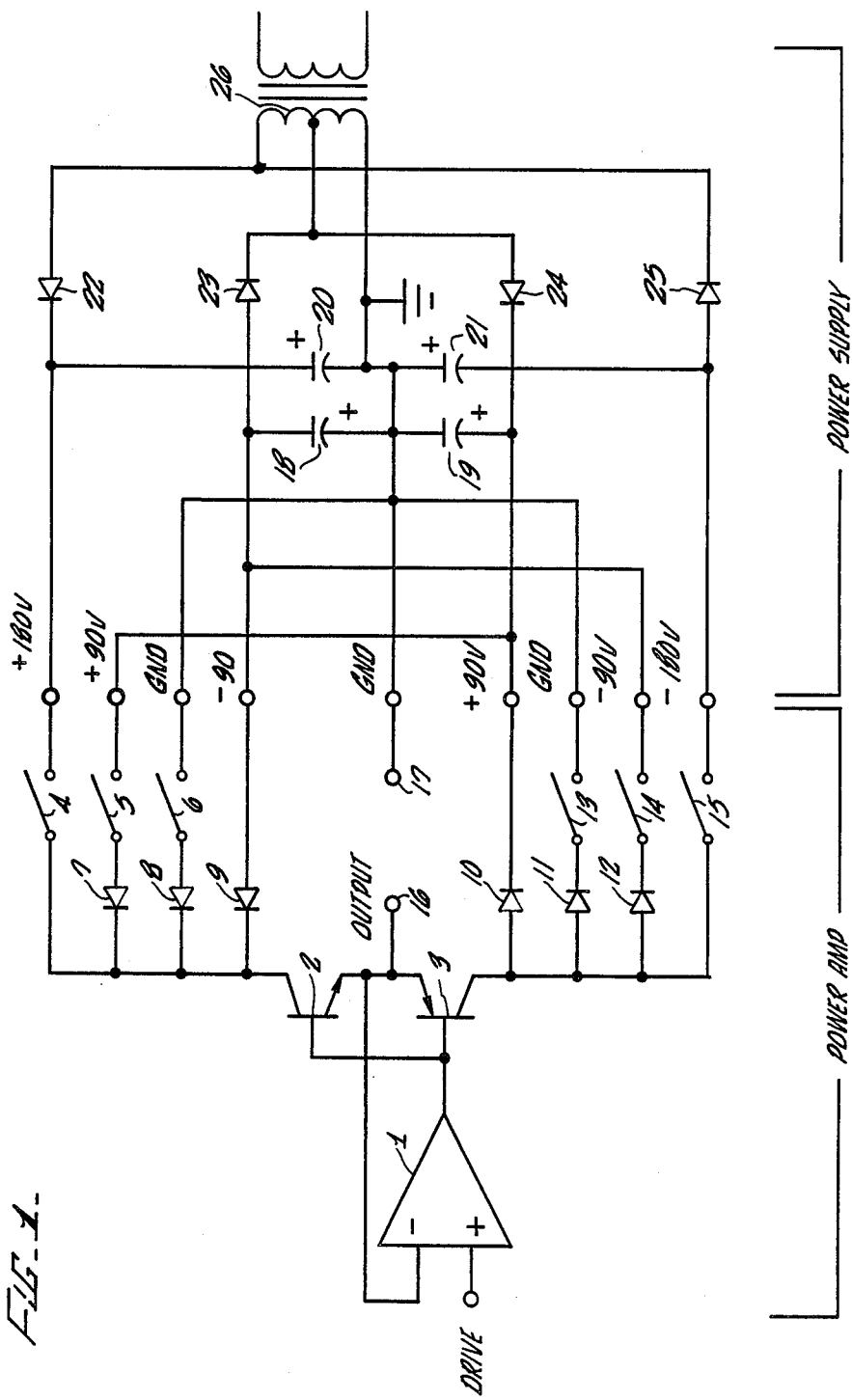
FIG. 1 is a simplified circuit diagram of the invention.

Referring more particularly to the drawings, there is shown in FIG. 1 a simplified circuit diagram of an A.C. class B power amplifier utilizing a multi-level direct current power supply in accordance with this invention. The diagram illustrates a typical complementary pair of NPN and PNP transistors (2, 3) operated in push-pull manner. During operation into a resistive load, as the output of the input driver (1) becomes positive the NPN transistor (2) tends to conduct, as the output signal becomes negative the PNP transistor (3) conducts and the NPN ceases conducting. Diodes (7, 8, 9, 10, 11, 13) are used to isolate each bias power level. The solid state switches (4, 5, 6, 13, 14, 15) are switched as the output voltage changes.

The unique feature of this invention is the inclusion of the 0 v and −90 v on the NPN driver (2) collector and the 0 v and +90 v on the collector of the PNP driver (3). Inclusion of the 0 v and −90 v bias levels allow the collector of the NPN driver (2), normally biased with a positive voltage, to be biased by a negative voltage that, relative to the negative output voltage, is positive to the collector. Normally during the negative half cycle the NPN transistor (2) would be biased off and the voltage of the last positive bias driver would be applied to the collector. By biasing with the 0 v and −90 v level, the stress is reduced on the normally biased off NPN transistor (2) as the 0 v and −90 v levels decrease the voltage across the non-conducting NPN transistor (2). The complementary PNP transistor (3) is biased in a similar manner using 0 v and +90 v. Although of advantage when driving a purely resistive load due to the reduced collector-emitter voltage, the use of the negative bias levels for the NPN transistor (2) and the positive bias for the PNP transistor (3) is very advantageous when driving reactive loads. The effect is to have the reactive load for design purposes appear similar to the resistive load design criteria thereby substantially reducing the design stress. The current that flows through a transistor device while voltage appears across the collector and the emitter gives rise to a stress termed second breakdown. Second breakdown stress is the result of energy densities resulting from the combined effect of the high voltage and current. In this invention when driving a reactive load, not only are the second breakdown stresses reduced on the power driver transistors (2, 3) and therefor power dissipation in the power driver transistor (2, 3) reduced, but power delivered to a reactive load is recovered and returned to the power supplies. Given a +0 power factor load (pure capacitive), output current leads output voltage by 90°. Referring to FIG. 1, the simplified circuit diagram, output (16) would be connected to a capacitive load. As output (16) nears the positive voltage peak, the +180 v switch (4) is closed and load current is supplied by the +180 v supply through the NPN power driver transistor (2). As the voltage peaks at +180 v and begins to decrease, current reverses and now must be supplied through the PNP power driver transistor (3). As output (16) is +180 volts, all negative current switches (13, 14, 15) are turned off, and the only source of negative current is through the +90 v isolation diode (10). Since voltage at the collector of PNP power driver transistor (3) is negative in respect to output (16), current is returned to the +90 v power supply and stored in power supply filter capacitor (18). The same process applies at the negative peak of the sine wave or for inductive (lagging) current loads.

Figure 2:
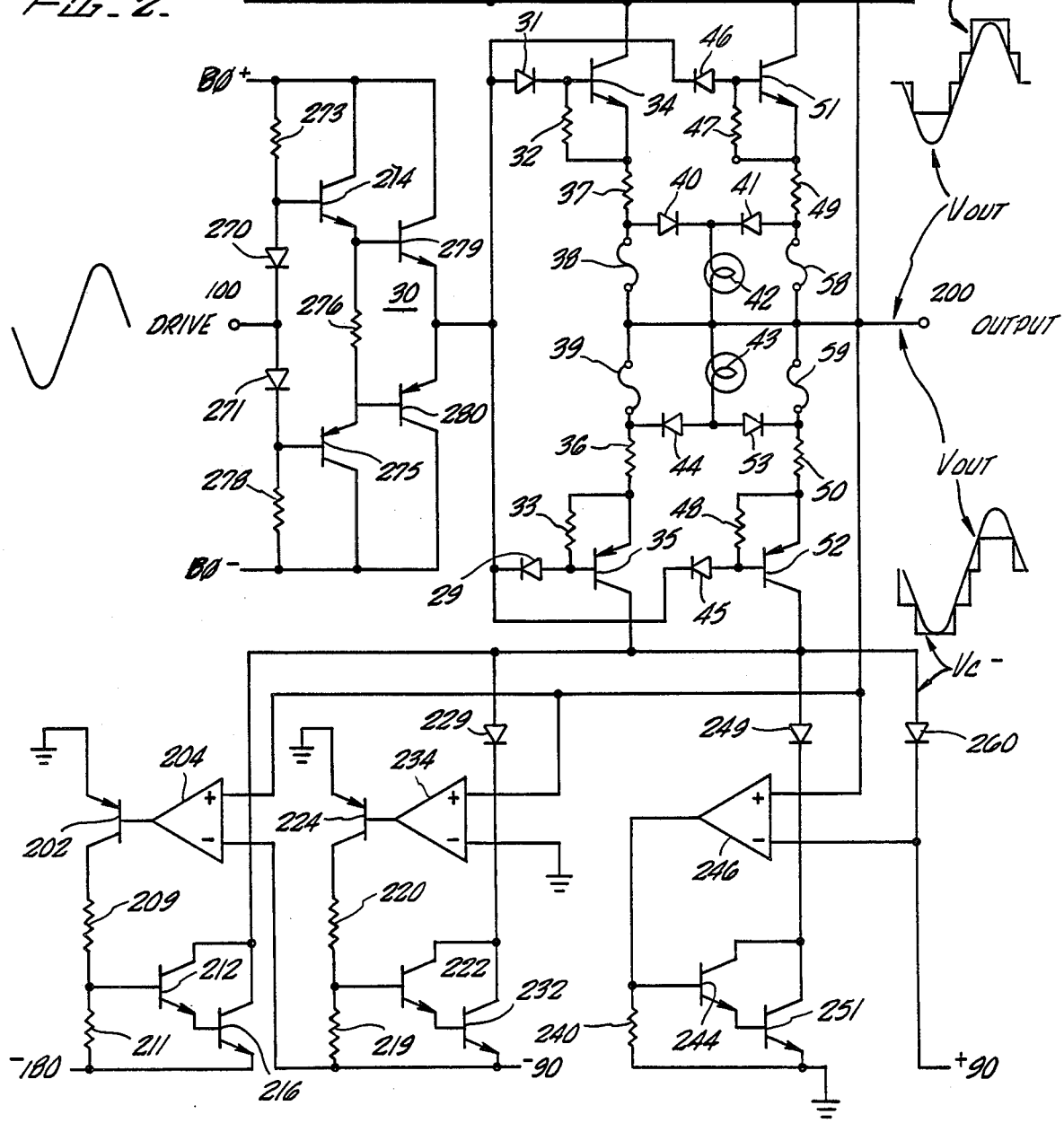
FIG. 2 is a schematic circuit diagram of an A.C. amplifier with a multi-level supply voltage in accordance with the invention.

Referring to FIG. 2 a more detailed circuit diagram is shown. A drive signal (100) is introduced at the input to the driver circuit. The drive signal (100) can be set at any level, the preferred embodiment has its principal application as a power source and utilizes a 120 VRMS input requiring low power. The drive signal (100) drives in standard push-pull fashion the complementary pair NPN, PNP, transistors (274, 275) which in turn drive the complementary pair of transistors (279, 280).

Two floating bias supplies B0+, B0− are referenced to the device output ground and supply a low voltage ±10 v DC, to allow saturation of the output power transistors. Resistors (273, 278) along with bias supplies B0+, and B0− and diodes (270, 271) form a constant current drive disconnect that prevents an amplifier failure from affecting the drive signal. This feature is required to allow high reliability in systems sharing parallel amplifiers. Resistor (276) sinks any leakage current produced by transistors (34, 35, 51, 52).

The power output of the driver circuit (30) as coupled to the output power transistors through diodes (29, 31, 45, 46). Each stage consists of a complementary pair of NPN-PNP output power transistors (34, 35, 51, 52). Although two sets are shown as many stages as are necessary to achieve the desired output power may be used. Each stage consists of identical complementary transistor coupled by diodes (30, 31, 45, 46) to provide isolation and power driver emitter resistors (36, 37, 49, 50) to assure current sharing. Base collector leakage sink resistors (32, 33, 47, 48) are selected to assure cutoff of the output power transistors (34, 35, 51, 52) during reverse biasing. A fuse (38, 39, 58, 59) has been added to the emitter of the output power transistor to provide protection to the circuit should the output power transistors (34, 51, 35, 52) fail in a collector-emitter short condition.

The output (200) of the power stage is sensed by bias level differential amplifiers (68, 92, 109, 204, 234, 246). For the positive biasing level the positive terminal of the bias level differential amplifiers (68, 92, 109) are connected to the output (200). The positive bias level differential amplifiers (68, 92, 109) controlling the positive bias levels have the positive terminal all connected together as are the positive terminals of negative bias power level differential amplifiers (204, 234, 246).

Each of the power biasing circuits utilize a separate power biasing supply. The embodiment shown utilizes +180 v, +90 v, 0 v, −90 v, −180 v biasing levels. Many more supply levels may be used and are selected based on the specific application.

Each bias level differential amplifier's (68, 92, 109, 204, 234, 246) input terminal, not connected in common, and sensing the output voltage level is connected in sequence such that the +180 v differential amplifiers input is referenced to the +90 volt level. The +90 volt level is referenced to the 0 v level.

As the output voltage (200) reaches its positive peak the +180 v power bias switching transistor (67) biased to +180 v is conducting. The +180 v bias power control driver (63) is conducting as a result of the output of the +180 v bias level differential amplifier (68) driving the +180 v bias power control driver (63) to saturation or near saturation. The +180 v bias level differential amplifier (68) is driven by the difference between the +90 v and the output (200). Once the +180 v bias power control driver (63) is turned on the +180 v bias power driver transistor (64) conducts and the current flows from the collector of the +180 v bias power driver transistor (64) to the base of the +180 v power bias switching transistor (67). When the power bias switching transistor (67) is on it applies the biasing voltage +180 v to the NPN output power transistor drivers (34, 51). The +180 v power bias voltage bias resistors (61, 62) are selected to assure complete saturation as the +180 v bias power control driver (63) is turned on. When the +180 v is supplied to the power drivers diodes (96, 110, 115) isolate the other drivers driven by lower bias voltage levels. As the output voltage (200) decreases the output of the +180 v bias level differential amplifier (68) will become negative and turn off the +180 v bias power control driver (63). The +180 v power bias switching transistor (67) connected to +180 v will in turn cease conducting.

The +90 v bias level differential amplifier (92) will commence operation similar to the +180 v bias level differential amplifier (92) circuit as the differential input becomes positive driving the +90 v bias power control transistor (89) to near saturation. As the +90 v bias power control transistor (89) conducts the +90 v bias power driver transistor (83) and +90 v power bias switching transistor (86) commence conducting through the +90 v isolation diode (96).

As the voltage decreases below zero, the 0 v power bias switching transistor (105) commences conduction. The 0 v bias level differential amplifier (109) drives the 0 v bias power driver transistor (104) directly without a bias control transistor. As the output voltage decreases further the 0 v bias level differential amplifier (109) ceases conduction of the 0 v power bias switching transistor (105) and the reference level −90 v is applied through an isolation diode (115). The same process occurs as the output becomes negative and the PNP output power transistors (32, 52) conduct. First the −90 v volt driver provides the bias next the −180 v bias. As the output (200) begins to increase the −90 v bias level the 0 v bias level and +90 v bias level are inturn applied.

The voltage at the collector of the NPN output power transistors (34, 51), and PNP transistor (35, 52) are illustrated as Vc+ and Vc− in FIG. 2. The unique negative biasing of the NPN output power transistor (34, 51) is shown.

Included in the preferred embodiment is the provision to have a plurality of power driver stages. To improve reliability in the event one of the transistors should catastrophically fail, a fuse (38, 58, 39, 59) has been added to the emitter or common electrode of the complementary pair of NPN-PNP transistor (34, 51, and 35, 52). When the drivers are arranged in parallel a failure of one will drastically effect the performance of the other drivers. Should a power transistor fail causing a collector to emitter short, excessive current will flow limited only by the emitter resistors (37, 49, 36, 50). A collector to base short will result in driving the power transistors (34, 51, 35, 52) to saturation, and in the absence of base drive diodes (29, 31, 45, 46) would saturate the entire parallel string of drivers. In the present invention the significance of a these failures is reduced by placing a fuse between the output and the emitter such that if a shorted device occurs, the fuse (38, 58, 39, 59) will open. By this technique many driver stages can be applied, reducing the current requirement of anyone driver, and, should failure occur, allowing the system to continue operation. Other disconnect means may also be used. Indicators (42, 43) will indicate after a fuse (38, 39, 58, 59) has opened providing a means to allow easy monitoring of the operation of each stage.

I claim:

1. A power amplifying system comprising
   multi-terminal DC power supply means for providing a ground, first and second positive voltage levels wherein said second positive voltage level is more positive that said first positive voltage level, first and second negative voltage levels wherein said second negative voltage level is more negative than said first negative voltage level,
   output transistor means having a first transistor for regulating a positive supply voltage applied to a load and a second transistor for regulating a negative supply voltage applied to said load, said first and second transistors having outputs connected together and adapted to be connected to said load, and
   switching means connected to said multi-terminal DC power supply means and to said first and second transistors for selectively connecting ground, said first and second positive voltage levels and said first and second negative voltage levels to said first and second transistors to maintain a minimum voltage differential across said first and second transistors while simultaneously maintaining linear operation of said power amplifying system.

2. A method of connecting a plurality of power supply voltages across a pair of output power devices comprising the steps of
   driving a first and second output power device with a drive signal,
   providing a plurality of positive and a plurality of negative supply voltage levels and ground, and
   selectively connecting said supply voltage levels and ground to said output power devices to maintain a minimum voltage differential across said output power devices while simultaneously maintaining linear operation of said output power devices.

3. A linear power amplifying system comprising
   a amplifier having a first power means for regulating a positive supply voltage applied to a load and a second power means for regulating a negative supply voltage applied applied to said load, said first and second power means each having a plurality of electrodes, one of which serves as an output, and said first and second power means being connected at their outputs,
   multi-terminal DC power supply means for providing a plurality of positive and a plurality of negative voltage levels, and
   switching means connected to said multi-terminal DC power supply means and to said first and second power means and adapted to selectively connect said positive and negative voltage levels to said first power means and to said second power means to maintain a minimum voltage differential across the first and second power means while simultaneously maintaining linear operation of said linear power amplifying system, said minimum voltage differential being maintained by providing a positive voltage level to said first power means and a less positive voltage level to said second power means during a portion of a positive output voltage cycle and by providing a negative voltage level to said second power means and a less negative voltage to said first power means during a portion of a negative output voltage cycle, said arrangement causing power to be returned from said load to said multi-terminal DC power supply means during a portion of said positive and negative output voltage cycles when said load has capacitive or inductive properties.

4. A power amplifying system comprising
   drive means adapted to receive an input drive signal and provide an output drive signal corresponding to said input drive signal,
   first control means and second control means, said first control means having a first control input and said second control means having a second control input, both said first and second control inputs being connected to said drive means for receiving said output drive signal, said first control means having a first power input and a first power output and said second control means having a second power input and a second power output connected to said first power output and adapted to be connected to a load,
   multi-terminal DC power supply means for providing a plurality of positive and a plurality of negative voltage levels, and switch means connected to said multi-terminal DC power means for receiving said plurality of positive and said plurality of negative voltage levels, said switch means having first and second voltage outputs, said first voltage output being connected to said first power input and said second voltage output being connected to said second power input, said switch means being adapted to selectively connect said plurality of positive and said plurality of said negative voltage levels separately to said first power input and to said second power input, said switch means being adapted to supply the most positive voltage levels to said first power input and simultaneously supply a less positive voltage level to said second power input, said switch means also being adapted to supply the most negative voltage level to said second power input and simultaneously supply a less negative voltage level to said first power input.

5. A linear power amplifying system comprising
a amplifier having a first power means for regulating a positive supply current applied to a load and a second power means for regulating a negative supply current applied to said load, said first and second power means each having a plurality of electrodes, one of which serves as an output, and said first and second power means being connected at their outputs, multi-terminal DC power supply means for providing a plurality of positive and a plurality of negative voltage levels, and, switching means connected to said multi-terminal DC power supply means and to said first and second power means and adapted to selectively connect said positive and negative voltage levels to said first power means and to said second power means to maintain a minimum voltage differential across the first and second power means while simultaneously maintaining linear operation of said linear power amplifying system, said minimum voltage differential being maintained by providing a positive voltage level to said first power means and a less positive voltage level to said second power means during a portion of a positive output current cycle and by providing a negative voltage level to said first power means during a portion of a negative output current cycle, said arrangement causing power to be returned from said load to said multi-terminal DC power supply means during a portion of said positive and negative output current cycles when said load has capacitive or inductive properties.

6. A system as in claim 5 wherein,
said first and second power means are transistors and said electrodes comprise emitters, bases and collectors and said emitters serve as said outputs.

* * * * *